United States Patent [19]

Robinson

[11] 4,445,915

[45] May 1, 1984

[54] DUST COLLECTOR FILTER CARTRIDGE AND ATTACHMENT MEANS FOR SUSPENDING SAME FROM BAGHOUSE TUBE SHEET

[75] Inventor: James W. Robinson, Woodridge, Ill.

[73] Assignee: Flex-Kleen Corporation, Chicago, Ill.

[21] Appl. No.: 408,250

[22] Filed: Aug. 16, 1982

[51] Int. Cl.³ .............................................. B01D 46/52
[52] U.S. Cl. ....................................... 55/378; 55/302;
55/379; 55/502; 55/507; 55/509
[58] Field of Search ............. 55/302, 341 R, 374–379,
55/498, 502, 507, 509, 510; 210/323.2, 451, 452;
285/239, DIG. 22

[56] References Cited

U.S. PATENT DOCUMENTS

| | | | |
|---|---|---|---|
| 4,073,632 | 2/1978 | Reinauer et al. | 55/374 |
| 4,218,227 | 8/1980 | Frey | 55/302 |
| 4,256,473 | 3/1981 | De Martino | 55/379 |
| 4,276,069 | 6/1981 | Miller | 55/379 |
| 4,291,904 | 9/1981 | Iversen et al. | 55/378 |
| 4,292,057 | 9/1981 | Ulvestad et al. | 55/379 |
| 4,319,899 | 3/1982 | Labadie | 55/302 |
| 4,322,231 | 3/1982 | Hilzendeger et al. | 55/378 |

Primary Examiner—David L. Lacey
Attorney, Agent, or Firm—Paul & Paul

[57] ABSTRACT

In a dust filter baghouse which employs a small-diameter filter cartridge, the same attachment structure is adapted for installation of the cartridge from either below or above the baghouse tube sheet. The cartridge has an annular cap having an external bead which is received within an annular recess of a skirt portion of a hollow boot which is clamped to the cap of the cartridge and extends up to the tube sheet. Where the cartridge has to be installed from below the tube sheet, a cylindrical cup is provided having an inward flange at its upper end which is secured to the tube sheet. The cylindrical cup has an annular external recess which receives an annular internal bead on the hollow boot. Where the cartridge is installed from above the tube sheet, an external annular groove in an outwardly extending flange at the upper end of the hollow boot is received within the peripheral edge of the hole in the tube sheet.

6 Claims, 3 Drawing Figures

DUST COLLECTOR FILTER CARTRIDGE AND ATTACHMENT MEANS FOR SUSPENDING SAME FROM BAGHOUSE TUBE SHEET

BACKGROUND OF THE INVENTION

This invention relates to a filter media for apparatus for commercial or industrial use in removing particulate matter, such as dust, from a stream of gas, such as air, by cartridge filtration.

In dust filtering apparatus, a baghouse is used which, in the prior art, usually houses an array of cylindrical filter bags suspended from a tube sheet. However, in some prior art installations, an array of filter cartridges, instead of filter bags, have been used.

A dust filter bag is a tubular bag of cylindrical cross section, usually made of fabric which permits passage of air therethrough into the interior of the bag but obstructs passage of dust therethrough. The dust collects on the outer surface of the fabric and from time to time is removed, as by a blast of reverse air.

A filter cartridge, as distinguished from a filter bag, includes an inner perforated tubular sleeve or tube, usually of metal, which is surrounded by an annular filter media, usually of paper, for example, resin impregnated paper. In the prior art, the paper filter media has been pleated for the purpose of increasing the total surface area of the media and to permit the cartridge to be of shorter length than would otherwise be required.

The filter bags or filter cartridges, as the case may be, are suspended in a baghouse which is divided into two sections, a lower dust-laden air chamber, and an upper clean-air chamber. The two chambers are separated by a tube sheet having rows of spaced holes, each of which is in registry with one of the filter bags or filter cartridges. The dust-laden air is blown or drawn upwardly and passes through the wall of the filter bag or cartridge into the interior thereof. The dust does not pass through and collects on the outer surface of the fabric of the filter bag or on the outer surface of the pleated paper media of the cartridge. The dust-free air continues on, upwardly through the open mouths of the bags or cartridges through the holes in the tube sheet and into the upper or clean-air chamber.

Over a period of time, the collection of dust on the outer surface of the bag or cartridge, unless removed, would impede, and eventually prevent, flow of air through the wall and into the interior of the filter bag or cartridge.

The prior art has provided methods for removing the accumulation of dust from the outer wall. Pressurized air is blown in a reverse direction through the bag or cartridge. This is done by injecting a blast of air under pressure into the mouth of the bag to cause it to flow downwardly and outwardly through the fabric or paper wall, thereby to dislodge the dust accumulated on the outer surface of the wall and cause it to fall into a receptacle at the bottom of the lower chamber of the baghouse. A venturi is used to amplify the reverse air.

The prior art has also provided a pneumatic pulse jet system which provides continuous automatic cleaning of the baghouse but cleans only one row of bags or cartridges at a time. Using a timed cycle, a burst of compressed air is directed down through the venturi at the top of each bag in a single row. This induces clean air into the bag setting up a pneumatic shock wave inside. The air flow upwardly through the bag is momentarily stopped and the bag is flexed outwardly, causing accumulated dust particles to drop off into the collector hopper. Since only one row of bags is subjected to the blast of compressed air at a time, there is no interruption of air flow upwardly through the other filter bags or cartridges. This system provides a smooth operating dust control or material handling system.

Prior art filter cartridge systems have been capable of filtering relatively small concentrations of dust or fumes from slow moving air stream, but have not been capable of filtering large concentrations of dust from fast moving air streams. The reason for the inability of the prior art filter cartridge system to handle fast moving air streams carrying large concentrations of dust is the fact that the prior art system has used large diameter cartridge elements having a large number of deep closely-spaced pleats forming a large number of small-angled dust-collecting pockets. The dust becomes so lodged in the deep small-angle pockets that it cannot be effectively removed by the reverse jet air blast. This reduces the effective area of the filter media and has forced the prior art cartridges to have large areas of filter media for each cartridge element. Such large filter elements, when laden with dust become heavy and filter element replacement is made more difficult.

The efficiency and effectiveness of the filter cartridge can be increased by using a cartridge of relatively small diameter with filter media having a relatively small number of pleats of relatively short length, but substantially wider dust angles.

An important advantage of the small diameter filter cartridge is that it may be installed in existing baghouses to replace the closely spaced filter bags now contained in such baghouses. As described previously herein, a typical filter bag has a diameter of about six inches. In contrast thereto, prior art filter cartridges have an outside diameter of the order of twelve inches and thus cannot be used to replace filter bags in existing baghouses. Such baghouses may have as many as 500 filter bags in closely spaced rows and it is an important practical advantage to be able to replace each filter bag with a filter cartridge without having to replace the tube sheet.

The present application describes and claims mechanical attachment structure adapted for installing a small-diameter filter cartridge in baghouses, including existing baghouses in which the filter elements are closely spaced filter bags.

DETAILED DESCRIPTION OF THE PREFERRED EMBODIMENTS

Figure 1:
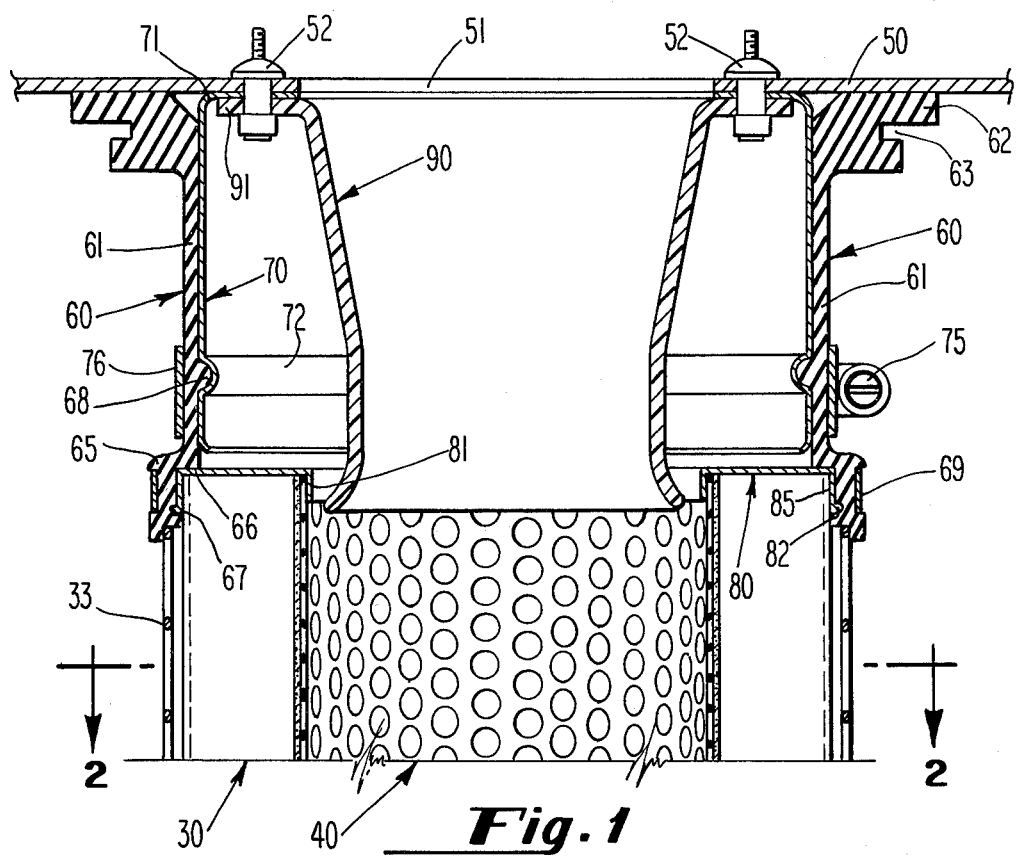
FIG. 1 is an elevational view, in section, of an attachment means adapted for installing and removing the small-diameter filter cartridge, where the maintenance man has access to the lower chamber of the baghouse.
Figure 2:
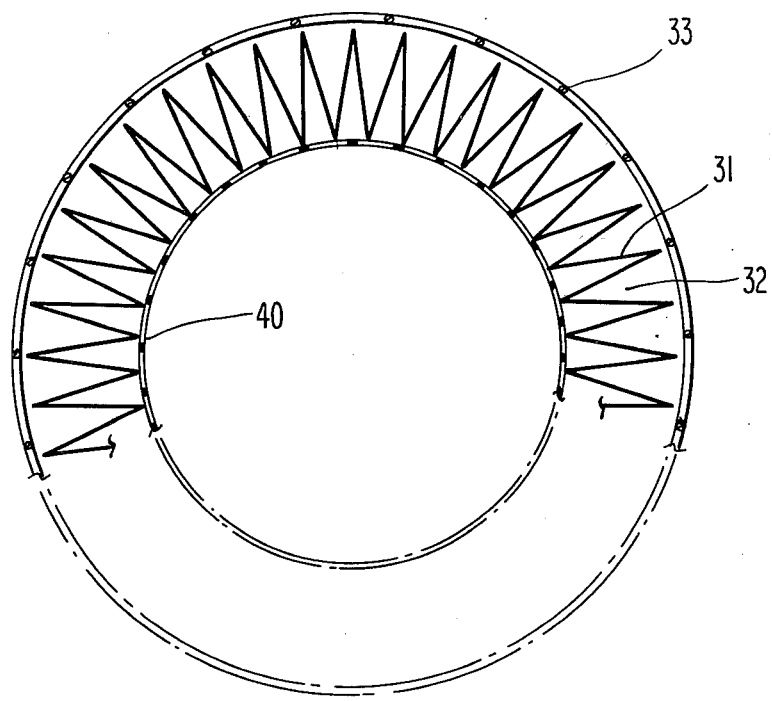
FIG. 2 is a plan view of the new filter cartridge.

Referring now to FIGS. 1 and 2, there is shown a perforated cylindrical metal sleeve 40 having thereabout an encircling filter media 30. The filter media 30, preferably resin impregnated paper, is pleated, the pleats 31 forming pockets 32 in which the dust is collected. Encircling the pleated filter media 30 is a wire cage 33.

Affixed to the upper end of the filter media 30 is an annular member 80 which serves as a cap for the pleated filter media 30. The cap 80 has a depending inner flange 81 which engages the peripheral upper edge of the sleeve 40, and a depending outer flange 85 which has an exterior bead 82 which is received within the annular groove 67 in the lower skirt portion 65 of a cylindrical rubber boot 60. Boot 60 is provided at its upper end with an enlarged flange portion 62 having in its outer surface an annular recess 63. This recess 63 is not used in bottom installation, illustrated in FIG. 1, but is used in top installation, illustrated in FIG. 3.

As seen in FIG. 1, the skirt portion 65 of the boot 60 is somewhat larger in diameter than the cylindrical wall 61 of boot 60 between the skirt 65 and the upper flange 62 forming an inner shoulder 66 which is adapted to receive the outer peripheral edge portion of cap 80. Embracing the skirt 65 is a steel band 69 which functions to clamp the skirt 65 tightly to the outer flange 85 of the cap 80, with bead 82 in groove 67.

Above the skirt portion 65 of boot 60, the cylindrical wall 61 of the boot is provided with an interior annular rib 68 which is adapted to be received within the annular groove 72 of a bag cup 70. Fitted around the wall 61 of the boot 60 is a band clamp 76, adapted to be tightened by a screw 75. Clamp 76 clamps the rib 68 tightly within the groove 72. The upper edge of bag cup 70 is turned inwardly, forming an annular rim 71.

Positioned above the filter cartridge sleeve 40 is a venturi nozzle 90 having at its upper end an outward flange 91.

It will be seen that the attachment means shown in FIG. 1 supports the filter cartridge, comprising sleeve 40 and pleated annular filter media 30, in a position below the circular opening 51 in tube sheet 50, with the attachment means being secured to tube sheet 50 by means of a plurality of fasteners 52. To remove the filter cartridge, the maintenance man working in the lower chamber of the baghouse, removes the clamp 76 and pulls the boot/cartridge down and off the bag cup 70 as an assembly. To install the filter cartridge, he reverses the steps.

Figure 3:
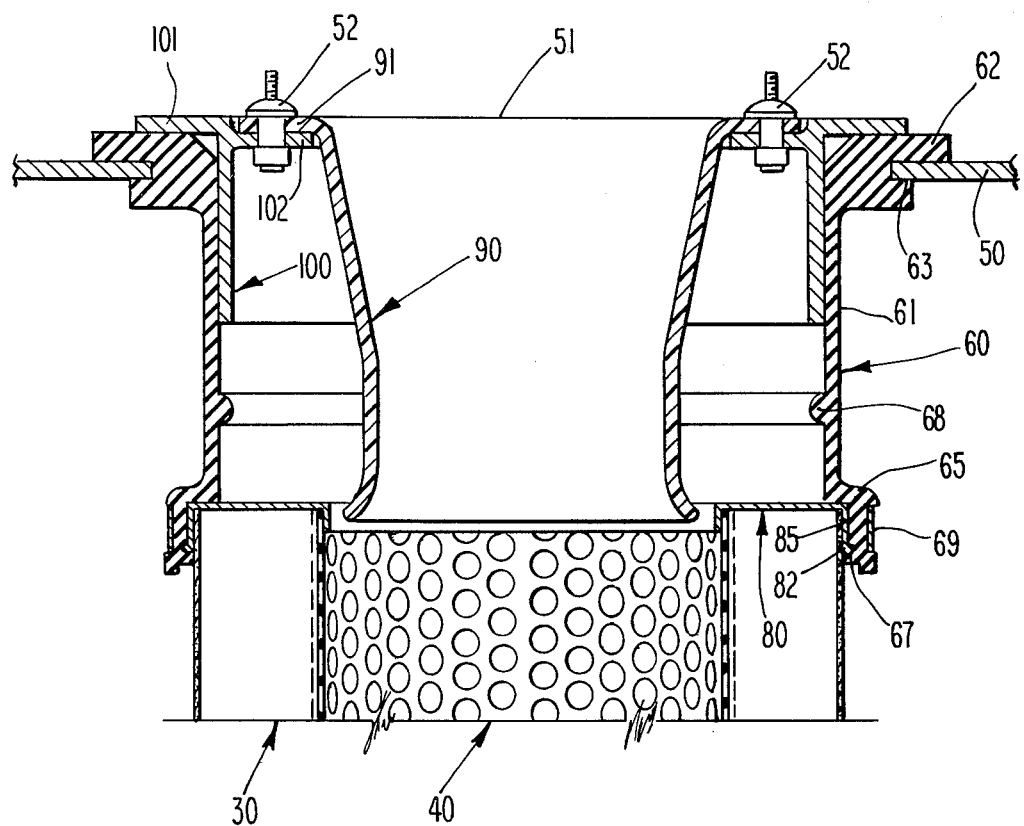
FIG. 3 is an elevational view, in section, of the attachment means for installing and removing the small-diameter filter cartridge, where the maintenance man has access to the upper clean-air chamber.

In FIG. 3, an attachment means is shown which is adapted for top installation and removal. That is to say, the attachment means permits the maintenance man to install and remove the filter cartridge from the clean-air space above the tube sheet 50.

In FIG. 3, the rubber boot 60 is identical to that shown in FIG. 1. However, in FIG. 3, the peripheral edge which defines the circular hole 51 in tube sheet 50 is received within recess 63 in flange portion 62 of boot 60.

The filter cartridge, comprising the perforated metal sleeve 40 and the pleated filter media 30 are supported by the skirt portion 65 of boot 60 in the identical manner in which the filter cartridge is supported in the mechanism of FIG. 1.

In FIG. 3, an adapter 100 is employed between the boot 60 and the venturi nozzle 90. Adapter 100 is generally cylindrical having an outwardly extending flange portion 101 which is adapted to rest on the flange 62 of boot 60, and an inwardly extending flange portion 102 which is adapted to support the venturi 90. The adapter 100 does not support the filter cartridge. The cartridge is supported by the boot.

To install the filter cartridge of FIG. 3, the maintenance man, working in the clean-air chamber above the tube sheet 50, first attaches the filter cartridge to the lower skirt portion 65 of boot 60, using the steel band 69 to hold the bead 82 in the groove 67. He then lowers the filter cartridge and boot through the opening 51 in the tube sheet until the flange portion 62 of boot 60 nears the tube sheet 50. He then compresses the boot 60 into a kidney shape, lowers the boot to a position such that the recess 63 is at the level of tube sheet 50, and then allows the boot 60 to snap back into circular shape with the peripheral edge of the tube sheet being received within recess 63. The maintenance man then inserts the adapter 100 and the venturi nozzle 90 as an assembly, into position with flange 91 resting on flange 102 of the adapter.

To remove the filter cartridge, the maintenance man, working in the upper clean-air chamber above the tube sheet, reverses the steps of the procedure just described for installation.

What is claimed is:
1. A combination of
  A. a baghouse tube sheet having a plurality of holes therein;
  B. a small-diameter filter cartridge, said cartridge having an annular cap at its upper end, said cap having a depending outer flange having an exterior annular bead;
  C. attachment means connected to said filter cartridge and suspending said cartridge from said baghouse tube sheet and in flow communication with one of said holes, said attachment means being adapted for installation of the filter cartridge from either below or above the tube sheet, said attachment means comprising:
    a. a boot having a hollow cylindrical body portion;
    b. said boot having at the upper end of its body portion an outwardly extending flange having an annular groove in its exterior surface;
    c. said boot having at the lower end of its body portion a skirt having a diameter larger than that of the cylindrical body portion and forming an annular shoulder receiving the peripheral edge portion of said cap of said filter cartridge;
    d. said skirt having an annular groove in its inner surface receiving the annular bead of the cap of the filter cartridge; and
    e. a steel band embracing said skirt and holding said bead in said annular groove of said skirt.

2. The combination according to claim 1 wherein said body portion of said boot has an annular rib on its interior surface and wherein positioned above said filter cartridge is a cup of cylindrical configuration having in its outer surface an annular groove positioned to receive said annular rib, and a clamp embracing said boot at the level of said internal annular rib for holding said annular rib in said annular groove of said cup.

3. The combination according to claim 2 wherein said cup has an inner annular rim at its upper end abutting against the undersurface of the baghouse tube sheet at the peripheral edge of said one of said holes in said tube sheet, and wherein fastening means are provided for securing said bag cup to said tube sheet, thereby to support said boot, thereby to support said filter cartridge.

4. The combination according to claim 3 wherein positioned above said filter cartridge is a venturi, said venturi having an outwardly extending annular flange at its upper end, said flange corresponding in size to said annular rim of said cup and being supported by said fastening means which secure said cup to said baghouse tube sheet.

5. The combination according to claim 1 wherein said boot is so positioned relative to said baghouse tube sheet that the annular groove in the exterior surface of said flange of said boot is in horizontal alignment with said tube sheet, and wherein the peripheral edge of said one of said holes in said tube sheet is received within said annular groove, thereby to support said boot.

6. The combination according to claim 5 wherein a venturi is provided above said filter cartridge, and wherein a hollow cylindrical adapter is provided between said boot and said venturi, said venturi having an outwardly extending annular flange, said adapter having an outwardly extending flange at its upper end and being supported on said flange of said boot, said adapter having an inwardly extending flange fastened to the outwardly extending flange of said venturi, thereby to support said venturi.

* * * * *